United States Patent
Hattori et al.

(10) Patent No.: US 11,385,381 B2
(45) Date of Patent: Jul. 12, 2022

(54) FLOOD DETECTION DEVICE, FLOOD DETECTION SYSTEM, AND COMPUTER-READABLE STORAGE MEDIUM

(71) Applicant: TOYOTA JIDOSHA KABUSHIKI KAISHA, Toyota (JP)

(72) Inventors: Jun Hattori, Chofu (JP); Kenki Ueda, Tokyo-to (JP); Tetsuya Hashimoto, Tokyo-to (JP); Hajime Tojiki, Musashino (JP); Naoki Ishihara, Tokyo-to (JP); Hideki Kawai, Toyko-to (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/070,594

(22) Filed: Oct. 14, 2020

(65) Prior Publication Data
US 2021/0124088 A1    Apr. 29, 2021

(30) Foreign Application Priority Data
Oct. 24, 2019    (JP) .............................. JP2019-193790

(51) Int. Cl.
*G01W 1/02*    (2006.01)
*G01C 21/36*    (2006.01)

(52) U.S. Cl.
CPC ........... *G01W 1/02* (2013.01); *G01C 21/3691* (2013.01)

(58) Field of Classification Search
None
See application file for complete search history.

(56) References Cited

U.S. PATENT DOCUMENTS

| | | |
|---|---|---|
| 2011/0043377 A1 | 2/2011 | McGrath et al. |
| 2015/0066355 A1* | 3/2015 | Siegel ............... G01C 21/3492 701/410 |
| 2015/0360697 A1* | 12/2015 | Baek .................... B60W 40/09 701/23 |
| 2017/0015329 A1 | 1/2017 | Furukawa et al. |

FOREIGN PATENT DOCUMENTS

| | | |
|---|---|---|
| CN | 106347256 A | 1/2017 |
| JP | 2004-030450 A | 1/2004 |
| JP | 2004-341795 A | 12/2004 |
| JP | 2012-216103 A | 11/2012 |

OTHER PUBLICATIONS

Q. Yu and G. Heijenk, "Abiding Geocast for Warning Message Dissemination in Vehicular Ad Hoc Networks," ICC Workshops—2008 IEEE International Conference on Communications Workshops, 2008, pp. 400-404, doi: 10.1109/ICCW.2008.81. (Year: 2008).*

* cited by examiner

*Primary Examiner* — Roy Y Yi
(74) *Attorney, Agent, or Firm* — Oblon, McClelland, Maier & Neustadt, L.L.P.

(57) ABSTRACT

A flood detection device and method that acquires meteorological data; acquires traffic volume data representing vehicle traffic volume; and determines that an area, in which a vehicle traffic volume during or after rain is less than or equal to a predetermined number of vehicles, is flooded based on the meteorological data and the traffic volume data, when a probability, that the vehicle traffic volume in a normal time is less than or equal to the predetermined number of vehicles, is less than a predetermined value, the normal time being a state in which a rainfall amount is less than a predetermined value.

14 Claims, 13 Drawing Sheets

FIG.2
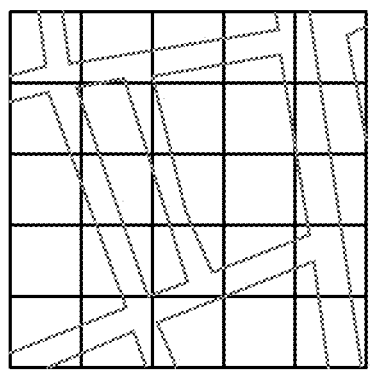 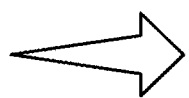 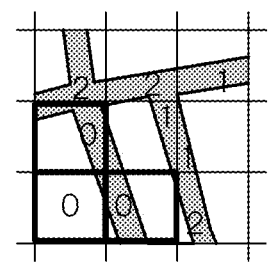
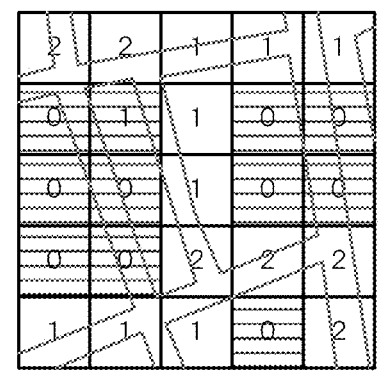

FIG.4
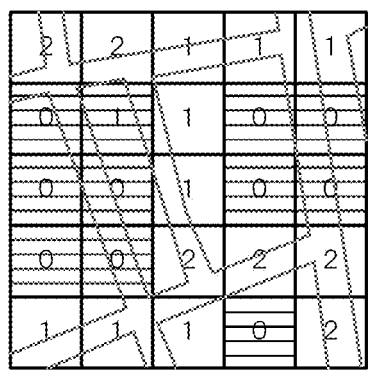
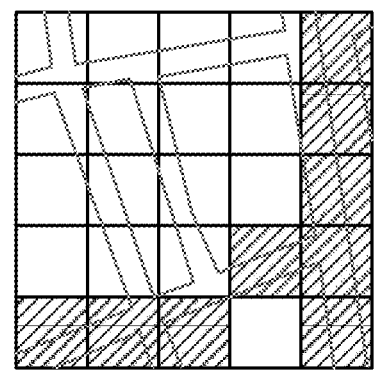
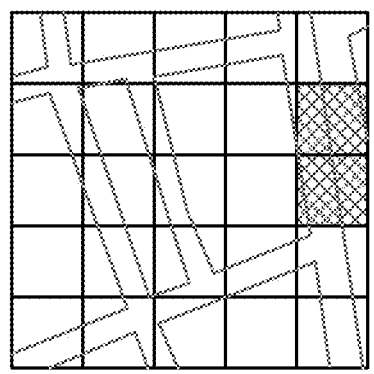

FIG.8

| VEHICLE TYPE ID | C1 | C21 | C22 | C23 | C24 |
|---|---|---|---|---|---|
| a | C1_a | C21_a | C22_a | C23_a | C24_a |
| b | C1_b | C21_b | C22_b | C23_b | C24_b |
| c | C1_c | C21_c | C22_c | C23_c | C24_c |

FLOOD DETECTION DEVICE, FLOOD DETECTION SYSTEM, AND COMPUTER-READABLE STORAGE MEDIUM

CROSS-REFERENCE TO RELATED APPLICATION

This application is based on and claims priority under 35 USC § 119 from Japanese Patent Application No. 2019-193790 filed on Oct. 24, 2019, the disclosure of which is incorporated by reference herein.

BACKGROUND

Technical Field

The present disclosure relates to a flood detection device, a flood detection system, and a computer-readable storage medium that stores a flood detection program.

Related Art

Roads may be flooded due to a large amount of rainfall or the inflow of rainwater that has fallen elsewhere. As a technique for detecting such flooding of a road, for example, the technique of Japanese Patent Laid-Open No. 2004-341795 (Patent Document 1) has been proposed.

In Patent Document 1, a flood sensor in a vehicle configured to detect the presence of a liquid substance detects flooding of a road, transmits the detection result to a center server, sends it to another vehicle to set up a route that does not pass through an impenetrable flood, and provides guidance on a detour route.

However, the technique of Patent Document 1 requires a flood sensor. Since the installation position of the flood sensor is different for each vehicle type, the determination result may be different depending on the vehicle type. Further, there are design restrictions in order to guarantee the determination results with the same accuracy. Therefore, there is room for improvement.

SUMMARY

The present disclosure has been made in consideration of the above facts and provides a flood detection device, a flood detection system, and a computer-readable storage storing a flood detection program capable of easily detecting a flood without separately providing a flood sensor on a vehicle.

A flood detection device according to a first aspect includes: a meteorological data acquisition unit that acquires meteorological data; a traffic volume data acquisition unit that acquires traffic volume data representing vehicle traffic volume; and a determination unit that, based on the meteorological data and the traffic volume data, determines that an area, in which a vehicle traffic volume during or after rain is less than or equal to a predetermined number of vehicles, and in which a probability, that the vehicle traffic volume in a normal time is less than or equal to a predetermined number of vehicles, is less than a predetermined value, is flooded, the normal time being a state in which a rainfall amount is less than a predetermined value.

According to the first aspect, the meteorological data acquisition unit acquires the meteorological data. For example, the meteorological data acquisition unit acquires rainfall data including at least one of the actual rainfall amount and the predicted rainfall for each place as the meteorological data.

The traffic volume data acquisition unit acquires traffic volume data indicating the traffic volume of the vehicle. For example, as in a second aspect, the traffic volume data acquisition unit may acquire position data and date/time data from the vehicle as the traffic volume data. As a result, the traffic volume is obtained from the vehicle position data and date/time data. Alternatively, as in a third aspect, the traffic volume data acquisition unit may acquire the traffic volume data detected by the roadside device provided on the roadside. Accordingly, the traffic volume can be obtained by acquiring the data from the roadside device.

Then, based on the meteorological data acquired by the meteorological data acquisition unit and the traffic volume data acquired by the traffic volume data acquisition unit, the determination unit determines that the area, in which the traffic volume of the vehicle is less than or equal to the predetermined number of vehicles during or after the rainfall and in which the probability that the traffic volume of vehicles in a normal time is less than or equal to a predetermined number of vehicles is lower than a predetermined threshold, is flooded, where the normal time is a state in which the amount of rainfall is less than a predetermined value. That is, the flood can be detected from the meteorological data and the traffic data. Therefore, it is possible to easily detect flood without separately providing a flood sensor on the vehicle.

As in a fourth aspect, the flood detection device according to any one of the first to the third aspect may further include: an acquisition unit that acquires a plurality of types of traveling state data relating to vehicle traveling and acquires vehicle type data, from a vehicle; a detection unit that detects flooding of the road on which the vehicle travels using a physical quantity, predicted based on a plurality of types of current traveling state data acquired by the acquisition unit and a vehicle behavior model that calculates a physical quantity that changes as the vehicle travels, and a physical quantity obtained from the current traveling state data; and a flood area determination unit that determines a flood area using a determination result of the determination unit and a detection result of the detection unit. Alternatively, as in a fifth aspect, the flood detection device according to any one of the first to the third aspect may further include: an acquisition unit that acquires a plurality of types of traveling state data regarding traveling and acquires vehicle type data, from a plurality of vehicles; a derivation unit that, using the plurality of types of traveling state data acquired in advance from the plurality of vehicles and a predetermined learning model, derives a vehicle behavior model that calculates a physical quantity that changes as the vehicles travel; a detection unit that detects flooding of the road on which a predetermined target vehicle travels using a physical quantity predicted using the vehicle behavior model derived by the derivation unit and the plurality of types of current traveling state data acquired by the acquisition unit from the target vehicle, and a physical quantity obtained from the traveling state data acquired by the acquisition unit from the target vehicle; and a flood area determination unit that determines a flood area using the determination result of the determination unit and the detection result of the detection unit. As a result, the flood area is detected using the result of determining the flooding based on the meteorological data, the traffic data, and the result of detecting the flood based on the traveling state data, so that the detection accuracy of the flooding is improved.

A flood detection system according to a sixth aspect includes: a traffic volume detection unit that detects vehicle traffic volume; a traffic volume data acquisition unit that acquires traffic volume data representing the traffic volume detected by the traffic volume detection unit; a meteorological data acquisition unit that acquires meteorological data; and a determination unit that, based on the meteorological data and the traffic volume data, determines that an area, in which the vehicle traffic volume during or after rain is less than or equal to a predetermined number of vehicles, and in which a probability, that the vehicle traffic volume in a normal time is less than or equal to a predetermined number of vehicles, is less than a predetermined threshold, is flooded, the normal time being a state in which a rainfall amount is less than a predetermined value.

According to the sixth aspect, the traffic volume detection unit detects the traffic volume of the vehicle, and the traffic volume data acquisition unit acquires the traffic volume data indicating the traffic volume detected by the detection unit. The traffic volume detection unit may detect the position of the vehicle and detect the traffic volume from the date and time data, for example. Alternatively, the traffic volume may be detected from the captured image by imaging with an image capturing device such as a camera provided on the roadside.

In addition, the meteorological data acquisition unit acquires meteorological data. For example, the meteorological data acquisition unit acquires rainfall data including at least one of the actual rainfall amount or the predicted rainfall for each place as the meteorological data.

Then, based on the meteorological data acquired by the meteorological data acquisition unit and the traffic volume data acquired by the traffic volume data acquisition unit, the determination unit determines that, the area in which the traffic volume of the vehicle is less than or equal to the predetermined number of vehicles during or after the rainfall and the probability that the traffic volume of vehicles in a normal time is less than or equal to a predetermined number of vehicles is lower than a predetermined threshold, is flooded, where the normal time is a state in which the amount of rainfall is less than a predetermined value. That is, since the flood can be detected from the meteorological data and the traffic data, it is possible to easily detect the flood without separately providing a flood sensor on the vehicle.

A flood detection system according to a seventh aspect includes: a traffic volume detection unit that detects vehicle traffic volume; a traffic volume data acquisition unit that acquires traffic volume data representing the traffic volume detected by the traffic volume detection unit; a meteorological data acquisition unit that acquires meteorological data; a determination unit that, based on the meteorological data and the traffic volume data, determines that an area, in which the vehicle traffic volume during or after rain is less than or equal to a predetermined number of vehicles, and in which a probability, that the vehicle traffic volume in a normal time is less than or equal to a predetermined number of vehicles, is less than a predetermined threshold, is flooded, the normal time being a state in which a rainfall amount is less than a predetermined value; a detection unit that detects a plurality of types of traveling state data regarding vehicle traveling; an acquisition unit that acquires the plurality of types of traveling state data detected by the detection unit and vehicle type data from a plurality of vehicles; a derivation unit that, using the plurality of types of traveling state data acquired in advance from the plurality of vehicles and a predetermined learning model, derives a vehicle behavior model that calculates a physical quantity that changes as the vehicle travels; a detection unit that detects flooding of the road on which a predetermined target vehicle travels using a physical quantity predicted using the vehicle behavior model derived by the derivation unit and the plurality of types of current traveling state data acquired by the acquisition unit from the target vehicle, and a physical quantity obtained from the traveling state data acquired by the acquisition unit from the target vehicle; and a flood area determination unit that determines a flood area using the determination result of the determination unit and the detection result of the detection unit.

According to the seventh aspect, the vehicle traffic volume is detected by the traffic volume detection unit and the traffic volume data detected by the traffic volume detection unit is acquired by the traffic volume data acquisition unit. The traffic volume detection unit may detect the position of the vehicle and detect the traffic volume from the date and time data, for example. Alternatively, the traffic volume may be detected from the captured image by image capturing with an image capturing device such as a camera provided on the roadside.

In addition, the meteorological data acquisition unit acquires meteorological data. For example, the meteorological data acquisition unit acquires rainfall data including at least one of the actual rainfall amount or the predicted rainfall for each place as the meteorological data.

Based on the meteorological data acquired by the meteorological data acquisition unit and the traffic volume data acquired by the traffic volume data acquisition unit, the determination unit determines that, the area in which the traffic volume of the vehicle is less than or equal to the predetermined number of vehicles during or after the rainfall and in which the probability that the traffic volume of vehicles during a normal time is less than or equal to the predetermined number of vehicles is lower than a predetermined threshold, is flooded, where the normal time is the state in which the amount of rainfall is less than a predetermined value.

Further, the detection unit detects plural types of traveling state data regarding traveling of the vehicle.

The acquisition unit acquires plural types of traveling state data and vehicle type data detected by the detection unit from plural vehicles.

In the derivation unit, a vehicle behavior model that obtains a physical quantity that changes as the vehicle travels is obtained for each vehicle type using plural types of traveling state data that the acquisition unit has previously obtained from plural vehicles and a predetermined learning model.

Using the vehicle behavior model derived by the derivation unit, the physical quantity predicted using the current plural types of traveling state data acquired by the acquisition unit from the predetermined target vehicle of interest, and the physical quantity obtained from the traveling state data acquired by the acquisition unit from the target vehicle of interest, the detection unit detects flooding of the road on which the vehicle of interest runs.

Then, the flood area determination unit determines the flood area using the determination result of the determination unit and the detection result of the detection unit. Accordingly, the traffic volume can be obtained by detecting the vehicle from the image data. Further, since the flood area is detected using the result of the flood determination based on the meteorological data and the traffic data and the result of the flood detection based on the traveling state data, the flood detection accuracy can be improved.

According to an eighth aspect, a computer readable-storage medium stores a flood detection program for causing a computer to function as each unit of the flood detection device according to any one of the first to the fifth aspects.

As described above, according to the present disclosure, it is possible to provide a flood detection device capable of easily detecting a flood without separately providing a flood sensor on a vehicle, a flood detection system, and a computer-readable storage medium storing a flood detection program. There is an effect.

BRIEF DESCRIPTION OF DRAWINGS

FIG. 2 is a diagram showing an example in which a map is divided into grids, a traffic volume is calculated for each grid, and a grid in which the traffic volume becomes 0 during or after rain is extracted.

FIG. 4 is a figure showing an example in which the grid where the traffic volume becomes 0 during or after rain and the probability that the traffic volume becomes 0 during a normal time is less than a threshold is extracted, and the extracted grid is determined as a flooded location.

FIG. 8 is a diagram showing an example of a table in which vehicle types are associated with model coefficients.

DETAILED DESCRIPTION

Hereinafter, an example of an embodiment of the present disclosure will be described in detail with reference to the drawings.

First Embodiment

Figure 1:
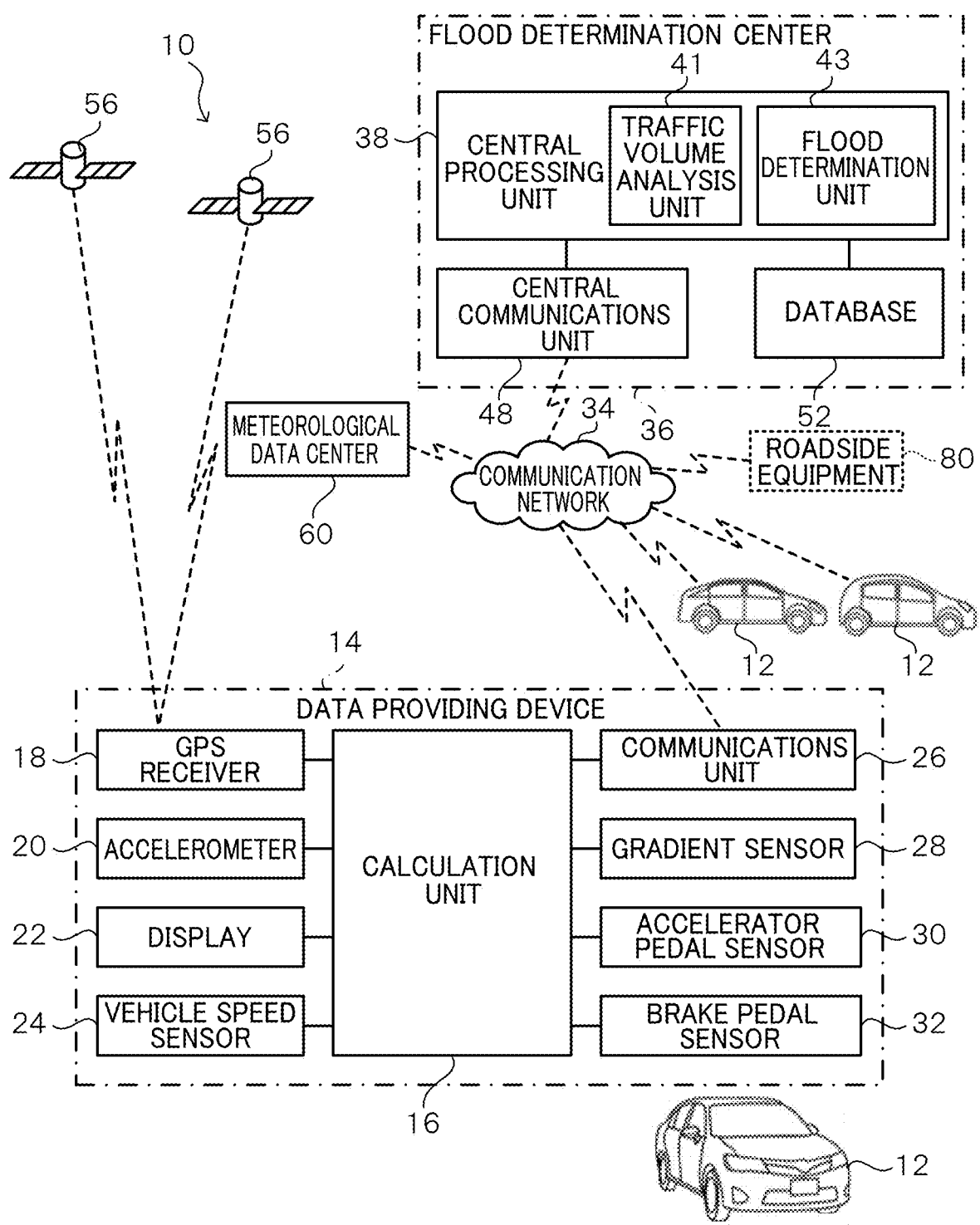
FIG. 1 is a block diagram showing a schematic configuration of a flood detection system according to the present embodiment.

FIG. 1 is a block diagram showing a schematic configuration of a flood detection system according to this embodiment.

In the flood detection system 10 according to the present embodiment, each of a data providing device 14 mounted on plural vehicles 12, a flood determination center 36, and a meteorological data center 60 is connected via a communication network 34.

The meteorological data center 60 provides various meteorological data relating to the meteorological weather as meteorological data to devices connected to the communication network 34. The meteorological data center 60 provides, for example, rainfall data including at least one of the actual rainfall amount or the predicted rainfall for each location as the meteorological data.

The flood determination center 36 collects the position data of the vehicles 12 from the data providing devices 14 mounted on the plurality of vehicles 12, together with the date and time. Further, the meteorological data is acquired from the meteorological data center 60. Then, using the collected position data of the vehicle 12 and the meteorological data, a process of determining flooding of the road is performed.

The data providing device 14 mounted on each vehicle 12 includes a calculation unit 16, a GPS receiver 18, an accelerometer 20, a display unit 22, a vehicle speed sensor 24, a communication unit 26, a gradient sensor 28, an accelerator pedal sensor 30, and a brake pedal sensor 32.

The calculation unit 16 is composed of a general microcomputer including a CPU (Central Processing Unit), a ROM (Read Only Memory), a RAM (Random Access Memory), and the like.

The GPS receiver 18 receives a signal from GPS (Global Positioning System) satellite and outputs the received GPS signal to the calculation unit 16. Thereby, the calculation unit 16 measures the position of the host vehicle 12 based on the GPS signals from plural GPS satellites.

The accelerometer 20 detects the acceleration applied to the vehicle 12, and outputs the detection result to the calculation unit 16. The acceleration may be detected in each of the front-rear direction, the width direction, and the vertical direction of the vehicle 12. Alternatively, only the front-rear direction acceleration of the vehicle 12 may be detected.

The display unit 22 displays data (for example, map data, etc.) on the flooded points determined to be flooded by the flood determination center 36, and various other data.

The vehicle speed sensor 24 detects the traveling speed of the host vehicle 12 and outputs the detection result to the calculation unit 16.

The communication unit 26 performs wireless communication with the communication network 34. As a result, it communicates with the flood determination center 36 and the data providing device 14 mounted on another vehicle 12. The communication network 34 includes, for example, a wireless communication network such as a mobile phone network.

The gradient sensor 28 detects the inclination of the vehicle 12. As a result, the gradient on which the vehicle 12 is traveling is detected, and the detection result is output to the calculation unit 16. As the gradient, the gradient in the front-rear direction of the vehicle 12 is detected. Alternatively, the gradient in the vehicle width direction may be added to the detection.

The accelerator pedal sensor 30 detects the depression amount of the accelerator pedal, and outputs the detection result to the calculation unit 16.

The brake pedal sensor 32 detects the operation state of the brake pedal and outputs the detection result to the calculation unit 16.

The calculation unit 16 transmits the position data obtained based on the GPS signal from the GPS receiver 18 to the flood determination center 36 via the communication unit 26 and the communication network 34.

On the other hand, the flood determination center 36 includes a central processing unit 38, a central communications unit 48, and a database 52.

The central communications unit 48 communicates with the data providing device 14 mounted on each vehicle 12 by performing wireless communication with the communication network 34.

The database 52 stores the position data acquired from the data providing device 14 mounted on each vehicle 12 together with the detection date and time data. The position data may be stored in association with the day of the week data in addition to the detection date and time data.

The central processing unit 38 is configured by a general computer including a CPU (Central Processing Unit), a ROM (Read Only Memory), a RAM (Random Access Memory), and the like. The central processing unit 38 has the functions of a traffic volume analysis unit 41 and a flood determination unit 43. Each function is realized by executing a program stored in the ROM or the like. Each function of the central processing unit 38 corresponds to a meteorological data acquisition unit, a traffic volume data acquisition unit, and a determination unit, and the details correspond to the processing described below.

The traffic volume analysis unit 41 analyzes the vehicle traffic volume during or after rainfall based on the meteorological data acquired from the meteorological data center 60 and the position data stored in the database 52. In the present embodiment, for example, as shown in FIG. 2, the map is divided into grids (areas divided into sections of a predetermined size). Then, the number of vehicles 12 existing per predetermined unit time of each divided grid is counted. With this, the traffic volume for each grid during or after rainfall is calculated. Then, a grid (for example, a grid hatched with horizontal lines in FIG. 2) in which the traffic volume becomes a predetermined number (0 in the present embodiment) during or after rain is extracted. The size of the grid is set to a size that does not include two or more roads in the grid. This makes it possible to calculate the traffic volume for each road. Further, in the present embodiment, the traffic volume is calculated from the position data collected from the vehicle 12 during or after rain. However, it is not limited to this. For example, the traffic volume analysis unit 41 may acquire data from the roadside device 80 such as a camera or a traffic volume sensor provided on the roadside shown by the dotted line in FIG. 1 to obtain the traffic volume.

Figure 3:
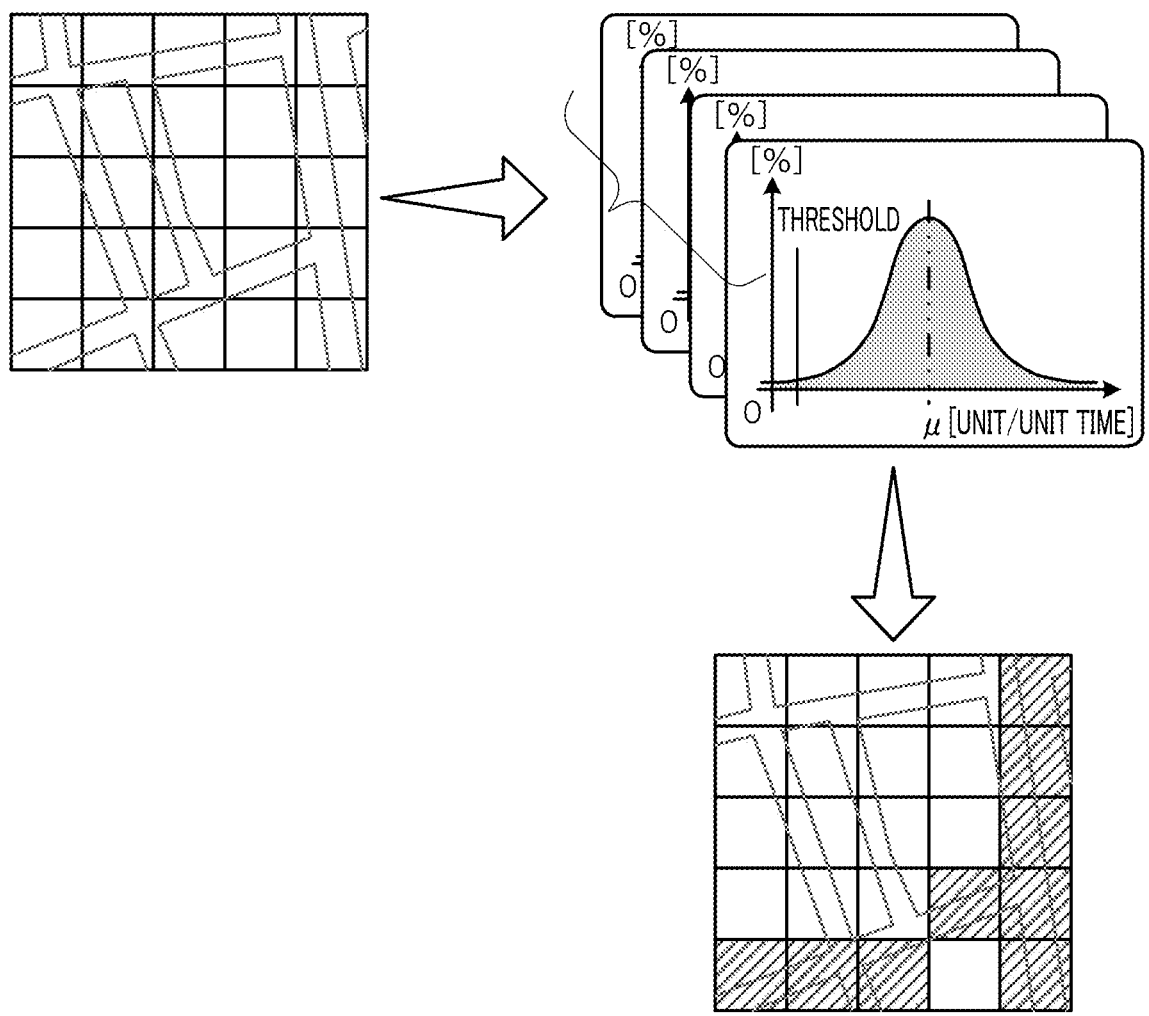
FIG. 3 is a diagram showing an example in which a map is divided into grids and a grid in which a probability that a traffic volume is 0 in a normal time is a threshold or less is extracted, where a state in which a rainfall amount is less than a predetermined value is set as a normal time.

In addition, the traffic volume analysis unit 41 determines that the grid for which a probability that the number of vehicles corresponding to the traffic volume during the normal time is less than or equal to the determined number (0 vehicles in this embodiment) is less than or equal to a threshold, where the normal time is a state in which the rainfall amount is less than a predetermined value (for example, the rainfall amount per hour is less than 10 mm) in the grid dividing the map. Specifically, based on the position data stored in the database 52, as shown in FIG. 3, the distribution of normal traffic volume is approximated by a Gaussian distribution for each grid. For the approximation of the distribution, the traffic volume data for the past few days during a normal time is used. In addition, when a predetermined threshold is set by the Gaussian distribution, the traffic volume does not become 0 in a normal time. Therefore, a grid (for example, a diagonally hatched grid in FIG. 3) whose probability that the traffic volume during a normal time is 0 is less than or equal to a predetermined threshold (lower limit value of the confidence interval) is extracted.

As shown in FIG. 4, the flood determination unit 43 extracts a grid in which the traffic volume is 0 during or after the rain and in which the probability that the traffic volume is 0 during a normal time is less than or equal to a threshold. Then, the extracted grid (for example, the cross-hatched grid in FIG. 4) is determined as an abnormal location, that is, a flooded location.

Figure 5:
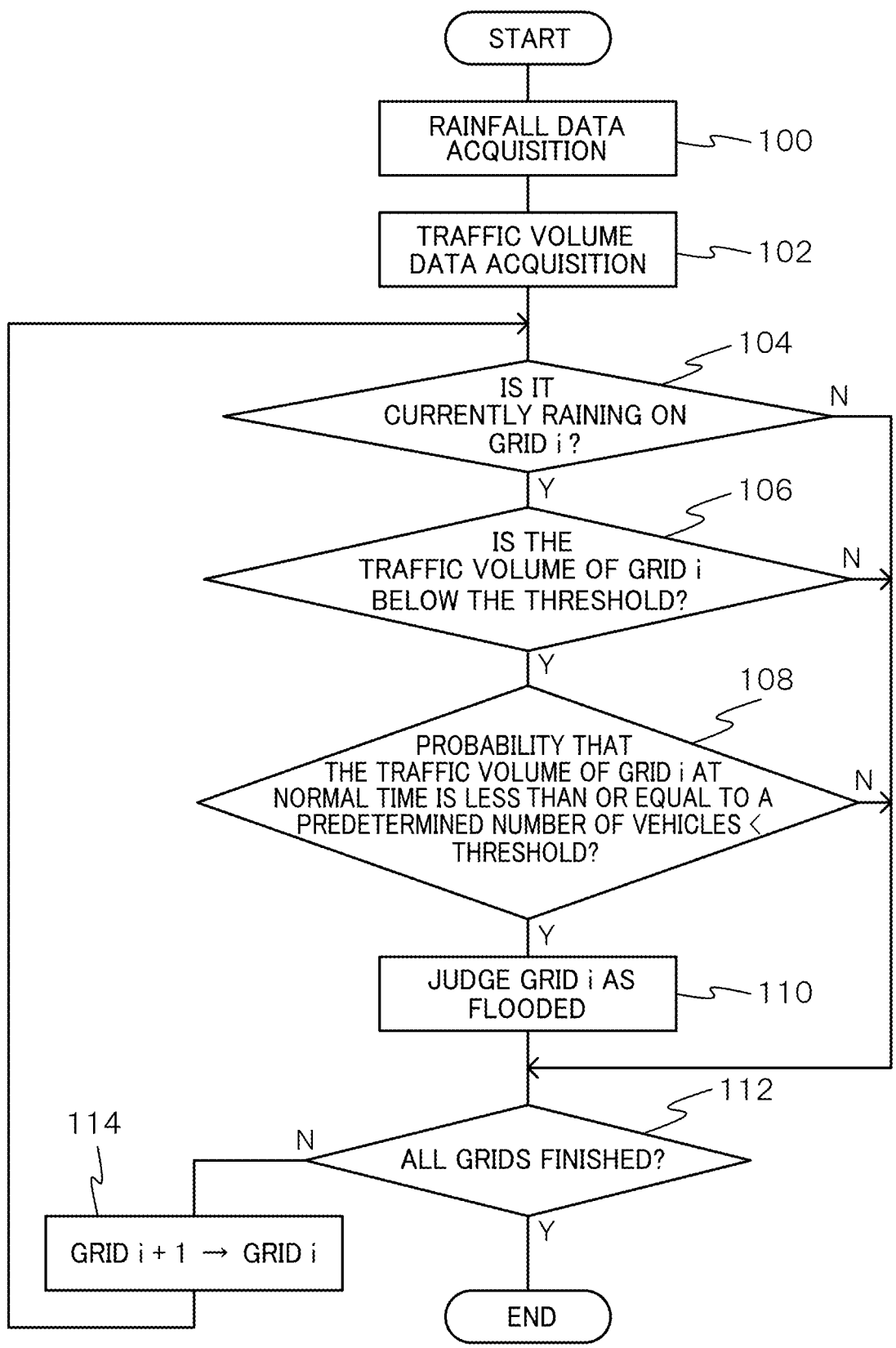
FIG. 5 is a flowchart showing an example of a flow of processing performed in a flood determination center of the flood detection system according to the present embodiment.

Next, a specific process performed by the flood determination center 36 of the flood detection system 10 according to this embodiment configured as described above will be described. FIG. 5 is a flowchart showing an example of the flow of processing performed in the flood determination center 36 of the flood detection system 10 according to this embodiment. Note that the process of FIG. 5 is started, for example, when the meteorological data center 60 provides data on rainfall (warning, etc.) to the flood determination center 36, or when the vehicle 12 makes a flood determination request.

In step 100, the central processing unit 38 acquires rainfall data from the meteorological data center 60 via the central communications unit 48 and the communication network 34, and proceeds to step 102. Note that step 100 corresponds to the meteorological data acquisition unit.

In step 102, the traffic volume analysis unit 41 acquires traffic volume data from the database 52 and each vehicle 12, and proceeds to step 104. The traffic volume data is acquired from each vehicle 12 including the position data of the vehicle 12 stored in the database 52 together with the date and time and the current position data of each vehicle 12. Note that step 102 corresponds to the traffic volume data acquisition unit.

In step 104, the traffic volume analysis unit 41 determines whether or not there is currently rainfall on the grid i of interest. The determination is made based on the meteorological data acquired from the meteorological data center 60. If the determination is affirmative, the routine proceeds to step 106, and if negative, the routine proceeds to step 112.

In step 106, the traffic volume analysis unit 41 determines whether the traffic volume of the grid i of interest at present is less than or equal to a threshold. In this embodiment, the determination is whether or not the traffic volume of the grid i of interest is zero. If the determination is affirmative, the process proceeds to step 108, and if the determination is negative, the process proceeds to step 112.

In step 108, the traffic volume analysis unit 41 determines whether or not a probability that the traffic volume of the grid i of interest during a normal time is less than or equal to the predetermined number of vehicles used as the threshold in step 106 is smaller than a predetermined threshold. In the present embodiment, it is determined whether or not the probability that the traffic volume of the grid i of interest during a normal time is 0 is smaller than a predetermined threshold. If the determination is affirmative, the process proceeds to step 110, and if the determination is negative, the process proceeds to step 112. The predetermined threshold may be a fixed value. Alternatively, the threshold of step 108 may be changed according to at least one of time and day of the week.

In step 110, the flood determination unit 43 determines that the grid i of interest is flooded, and proceeds to step 112. Note that steps 104 to 110 correspond to the determination unit.

In step 112, the flood determination unit 43 determines whether or not the above processing has been completed for all grids. If the determination is negative, the process proceeds to step 114, and if the determination is affirmative, the series of processes ends.

In step 114, the traffic volume analysis unit 41 changes the grid i of interest with the next grid i+1 as the grid i of interest, returns to step 104, and repeats the above processing.

By performing the processing as described above, in the present embodiment, the flood is determined using the traffic volume and the meteorological data calculated based on the position data collected from each vehicle 12. Therefore, it is possible to easily detect flood without separately providing a flood sensor on the vehicle 12.

Second Embodiment

Figure 6:
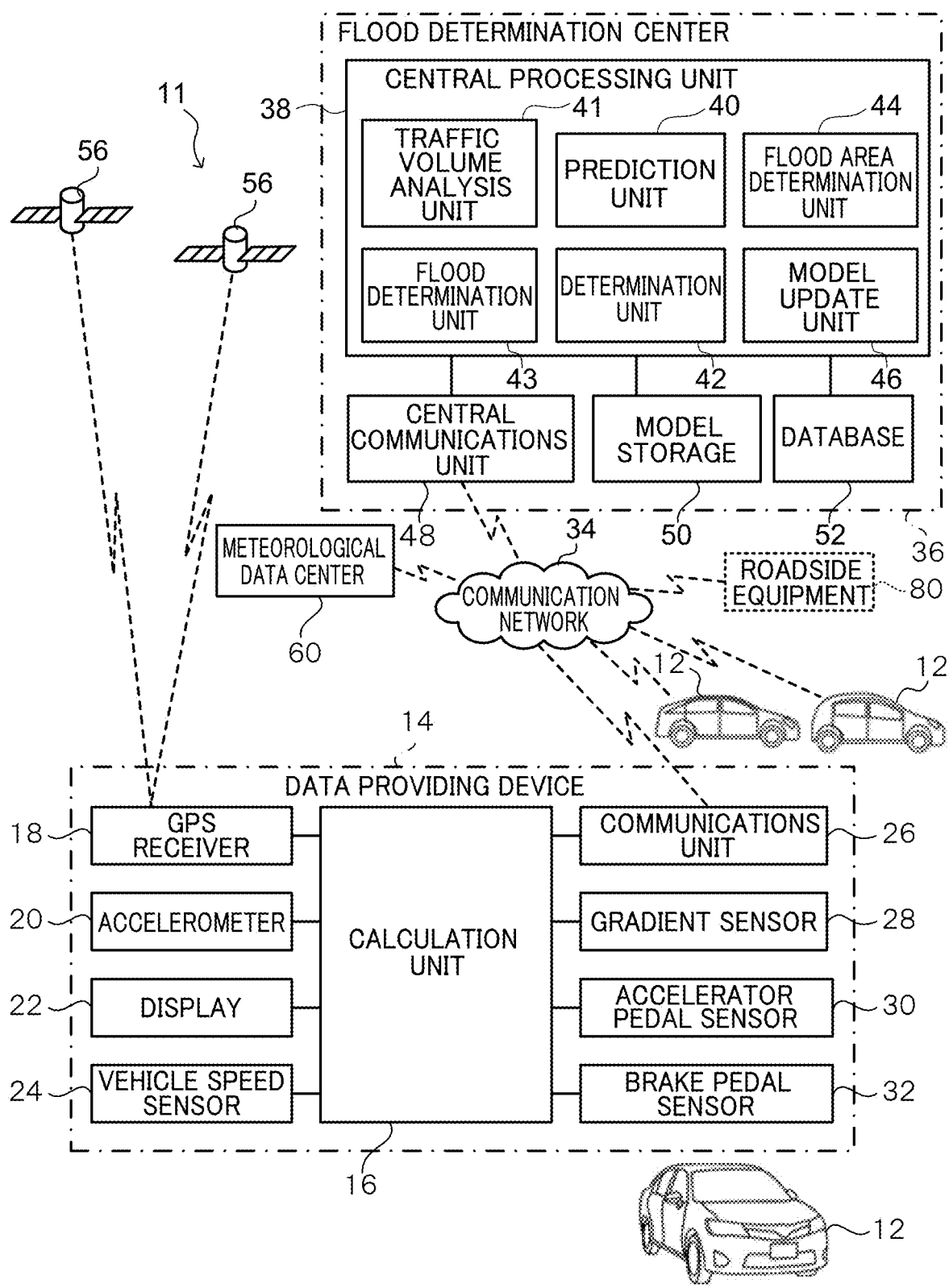
FIG. 6 is a block diagram showing a schematic configuration of a flood detection system according to a second embodiment.

Next, the flood detection system according to the second embodiment will be described. FIG. 6 is a block diagram showing a schematic configuration of a flood detection system according to the second embodiment. The same components as those in FIG. 1 are designated by the same reference numerals and detailed description thereof will be omitted.

In the first embodiment, the flood on the road is determined using the meteorological data and the traffic volume calculated from the position data of the vehicle 12. On the other hand, in the present embodiment, the flooding of the road is further determined using the traveling state data collected from the vehicle 12, and the flooding of the road is comprehensively determined from the two determination results.

That is, the flood determination center 36 of the flood detection system 11 according to the present embodiment collects the traveling state data of the vehicles 12 from the data providing devices 14 mounted on the plurality of vehicles 12 as CAN (Controller Area Network) data. Then, compared to the first embodiment, the processing for determining the flooding of the road on which each vehicle 12 is traveling using the collected CAN data is further performed.

In the present embodiment, each sensor of the accelerometer 20, the vehicle speed sensor 24, the gradient sensor 28, the accelerator pedal sensor 30, and the brake pedal sensor 32 corresponds to a detection unit. Then, an example will be described in which the acceleration, the traveling speed, the road gradient, the depression amount of the accelerator pedal, and the operation state of the brake pedal detected by these sensors are detected as an example of the traveling state data. However, it is not limited to these.

The calculation unit 16 transmits plural types of traveling state data acquired from each sensor and a vehicle type ID for identifying a vehicle type to the flood determination center 36 via the communication unit 26 and the communication network 34.

On the other hand, the flood determination center 36 further includes a model storage unit 50 as compared with the first embodiment, and the central processing unit 38 serves the functions of a prediction unit 40, a determination unit 42, a model update unit 46, and a flood area determination unit 44.

The model storage unit 50 stores a vehicle behavior model for obtaining a physical quantity (details will be described later) that changes as the vehicle 12 runs, and a coefficient table set for each vehicle type.

The database 52 further stores the traveling state data acquired from the data providing device 14 mounted on each vehicle 12 as CAN data.

The prediction unit 40 reads out a vehicle behavior model stored in advance in the model storage unit 50, identifies the vehicle type from the vehicle type ID, selects a coefficient corresponding to the vehicle type, and applies the coefficient to the vehicle behavior model. In this way, a vehicle behavior model for each vehicle type is derived. Then, the predicted value of the physical quantity is calculated by substituting the CAN data into the derived vehicle behavior model. In the present embodiment, the vehicle speed is applied as the physical quantity to be predicted, and a previously calculated coefficient corresponding to the vehicle type is applied to the vehicle behavior model derived in advance to obtain the vehicle speed, thereby calculating the predicted value of the vehicle speed. The details of the vehicle behavior model for obtaining the vehicle speed will be described later.

Figure 7:
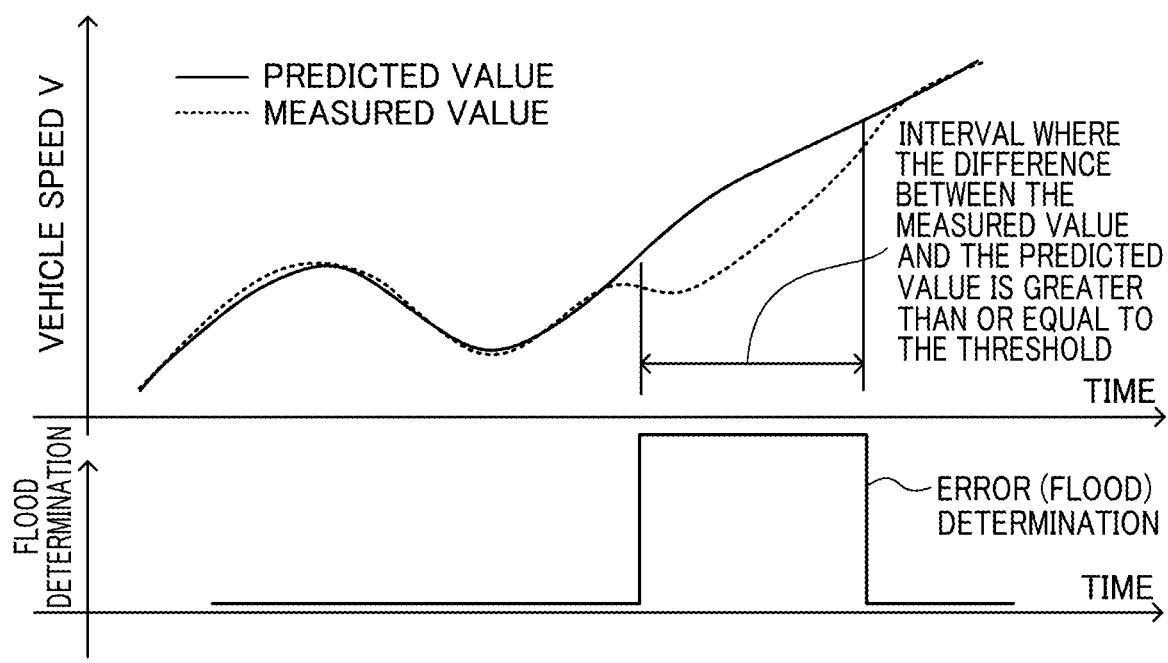
FIG. 7 is a diagram for explaining an example of error (flood) determination using a predicted value and a measured value of a vehicle speed.

The determination unit 42 compares the vehicle speed predicted by the prediction unit 40 with the actual vehicle speed acquired from the data providing device 14 to determine whether or not the road is flooded. Specifically, when the difference between the predicted value and the actually measured value is equal to or larger than a predetermined threshold, the road is determined to be flooded. For example, as shown in FIG. 7, when the actual measurement value and the predicted value change over time, the determination unit 42 determines that there is an error (flooding) in a section for which the state in which the difference between the actual measurement value and the predicted value is equal to or greater than a predetermined threshold continues for more than a predetermined time (for example, 5 seconds more).

The model updating unit 46 uses the CAN data stored in the database 52 to derive the coefficient of the vehicle behavior model by machine learning. In addition, the coefficient is stored in the model storage unit 50, and the coefficient table of the model is updated at any time.

The flood area determination unit 44 determines the area where the road is flooded by using the determination results of the flood determination unit 43 and the determination unit 42, respectively.

Next, an example of the vehicle behavior model for obtaining the vehicle speed described above will be described in detail. In this embodiment, a vehicle behavior model for deriving the vehicle speed as a physical quantity is derived using the equation of motion.

First, the equation of motion can be expressed by the following equation (1).

$$M \times (dv/dt) = F \tag{1}$$

Note that M is the vehicle weight, dv/dt is the acceleration, and F is the force by which the vehicle 12 moves forward.

Here, dv/dt can be approximately expressed by the following equation (2).

$$dv/dt = (v(t+\Delta t) - v(t))/\Delta t \tag{2}$$

Note that v(t+Δt) is the vehicle speed after Δt seconds (predicted vehicle speed), t is time, and v(t) is the vehicle speed at the current time.

By substituting the equation (2) into the equation (1), the following equation (3) is obtained.

$$M \times (v(t+\Delta t) - v(t))/\Delta t = F \quad (3)$$

Organizing the equation with respect to v(t+Δt) gives the following equation (4).

$$v(t+\Delta t) = v(t) + (F/M) \times \Delta t \quad (4)$$

Here, the term F is F=F1 (driving force of the vehicle 12)−F2 (resistance received by the vehicle 12), but using CAN data, $$F1 = C1 \times R \quad (5)$$

In addition, C1 is a coefficient, R is an accelerator depression amount, and is obtained from CAN data.

$$F2 = \text{air resistance} + \text{gradient resistance} + \text{rolling resistance} + \text{acceleration resistance} \quad (6)$$

Air resistance=$C21 \times v(t)^2$

Gradient resistance=$C22 \times \sin \theta$

Rolling resistance=$C23 \times v(t)$

Acceleration resistance=$C24 \times a(t)$

Note that C21, C22, C23, and C24 are coefficients, θ is the road surface gradient, v (t) is the vehicle speed, and a (t) is the acceleration, which can be obtained from the CAN data.

By substituting the equations (5) and (6) into the equation (4), the following multiple regression equation can be obtained as a vehicle behavior model.

$$v(t+\Delta t) = v(t) + \{C1 \times R - (C21 \times v(t)^2 + C22 \times \sin \theta + C23 \times v(t) + C24 \times a(t)) \times (\Delta t/M) \quad (7)$$

Each coefficient is obtained by a learning model of multiple regression analysis using a large amount of CAN data collected from plural vehicles 12 and stored in a CAN database, and is stored in the model storage unit 50 as a coefficient table. In addition, the coefficient stored in the model storage unit 50 is updated every time the CAN data is newly acquired. Further, since the coefficient differs for each vehicle type, the coefficient is obtained and updated for each vehicle type. For example, the coefficients stored in the model storage unit 50 are stored as a table in which vehicle types and model coefficients are associated with each other, as shown in FIG. 8.

Figure 9:
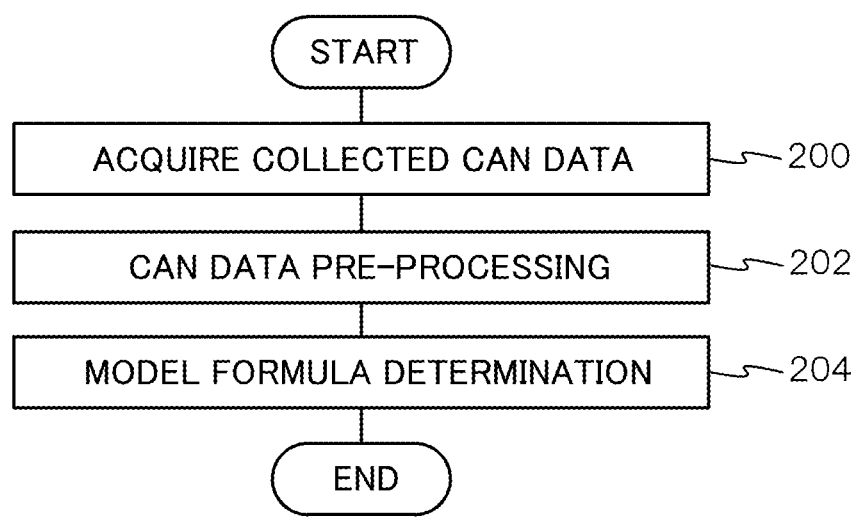
FIG. 9 is a flowchart showing an example of a flow of processing performed by a central processing unit when deriving a vehicle behavior model by machine learning in a flood determination center of the flood detection system according to the second embodiment.

Subsequently, in the flood detection system 11 according to the present embodiment configured as described above, a process when the central processing unit 38 derives the vehicle behavior model in the flood determination center 36 will be described. FIG. 9 is a flowchart showing an example of the flow of processing performed by the central processing unit 38 when the vehicle behavior model is derived by machine learning in the flood determination center 36 of the flood detection system 11 according to the present embodiment. The process of FIG. 9 is performed when deriving the initial coefficient of the vehicle behavior model, and is also performed each time the CAN data is collected in the database 52.

In step 200, the model updating unit 46 acquires the CAN data as the traveling state data collected in the database 52 via the central communications unit 48, and proceeds to step 202. Note that step 200 corresponds to the acquisition unit.

In step 202, the model updating unit 46 performs preprocessing of the acquired CAN data, and proceeds to step 204.

As the preprocessing, for example, the CAN data is sorted by date and time and vehicle type, and classified by time and vehicle type. Further, for each CAN data, processing such as interpolation may be performed for the data loss by unifying the time.

In step 204, the model updating unit 46 determines the model formula, stores it in the model storage unit 50, and ends the series of processes. That is, each coefficient of the multiple regression equation as the vehicle behavior model described above is derived by machine learning using CAN data and stored in the model storage unit 50. When each coefficient is already stored, each coefficient is updated. Note that step 204 corresponds to the derivation unit.

Figure 10:
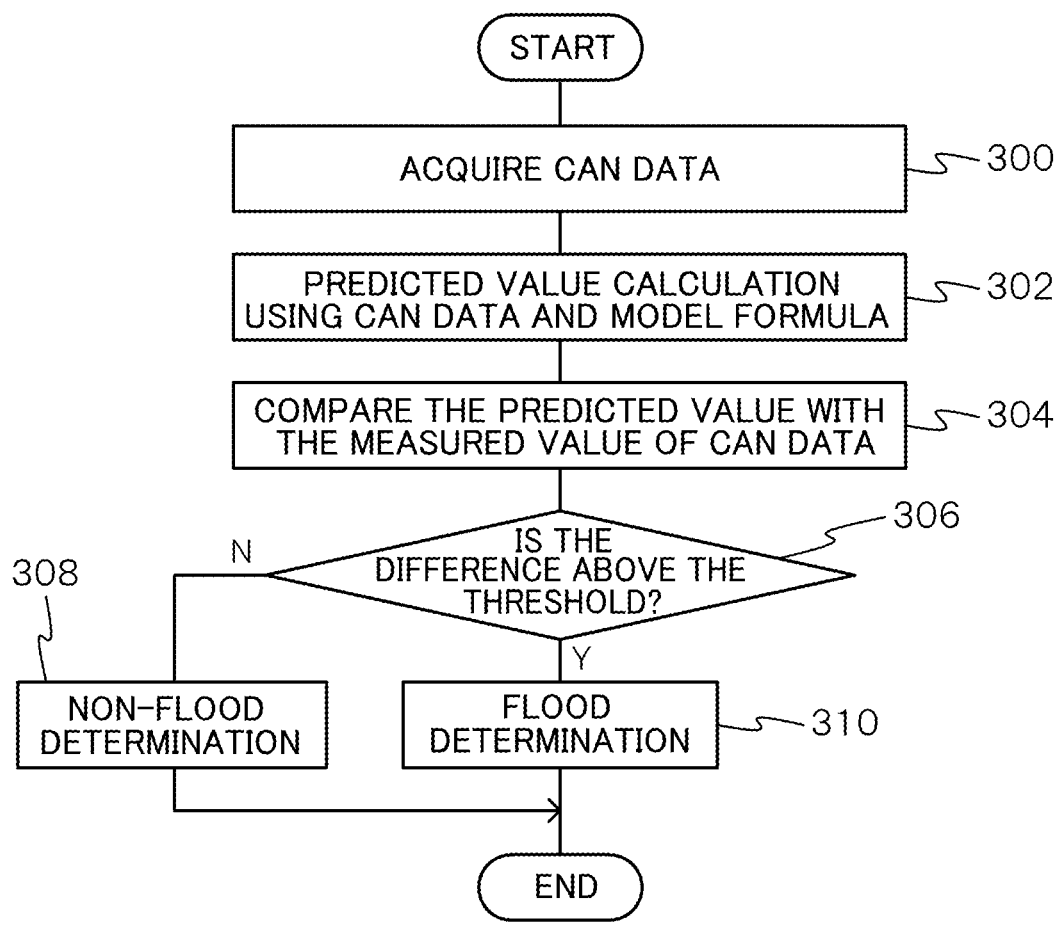
FIG. 10 is a flowchart showing an example of a flow of processing performed by a central processing unit when determining a flood in a flood determination center of the flood detection system according to the second embodiment.

Next, the processing performed by the central processing unit 38 in the flood determination center 36 when determining the flood based on the CAN data from each vehicle 12 will be described. FIG. 10 is a flowchart showing an example of the flow of processing performed by the central processing unit 38 when determining a flood in the flood determination center 36 of the flood detection system 11 according to the present embodiment. The process of FIG. 10 is started, for example, every time when the CAN data is acquired from the data providing device 14 of each vehicle 12 or when the CAN data of a predetermined amount is acquired.

In step 300, the central processing unit 38 acquires CAN data from the data providing device 14 via the central communications unit 48 and the communication network 34, and proceeds to step 302. Note that step 300 corresponds to the acquisition unit, and the processes of subsequent steps 302 to 310 correspond to the detection unit.

In step 302, the prediction unit 40 calculates the predicted value of the vehicle speed using the acquired CAN data and the vehicle behavior model, and proceeds to step 304. That is, the vehicle behavior model stored in the model storage unit 50 is read out, the vehicle type is identified from the vehicle type ID, and the coefficient corresponding to the vehicle type is selected and applied to the vehicle behavior model. Then, the predicted value of the vehicle speed is calculated by substituting the acquired CAN data into the vehicle behavior model.

In step 304, the determination unit 42 compares the predicted value of the vehicle speed with the actual measured value of the vehicle speed of the actual CAN data acquired from the data providing device 14, and proceeds to step 306.

In step 306, the determination unit 42 determines whether or not the difference between the predicted value and the actually measured value is equal to or greater than a predetermined threshold. If the determination is negative, the process proceeds to step 308, and if the determination is positive, the process proceeds to step 310.

In step 308, the determination unit 42 determines that the road on which the vehicle 12 that has acquired the CAN data runs is not flooded and terminates a series of processes.

On the other hand, in step 310, the determination unit 42 determines that the road on which the vehicle 12 that has acquired the CAN data is traveling is flooded and ends the series of processes.

Figure 11:
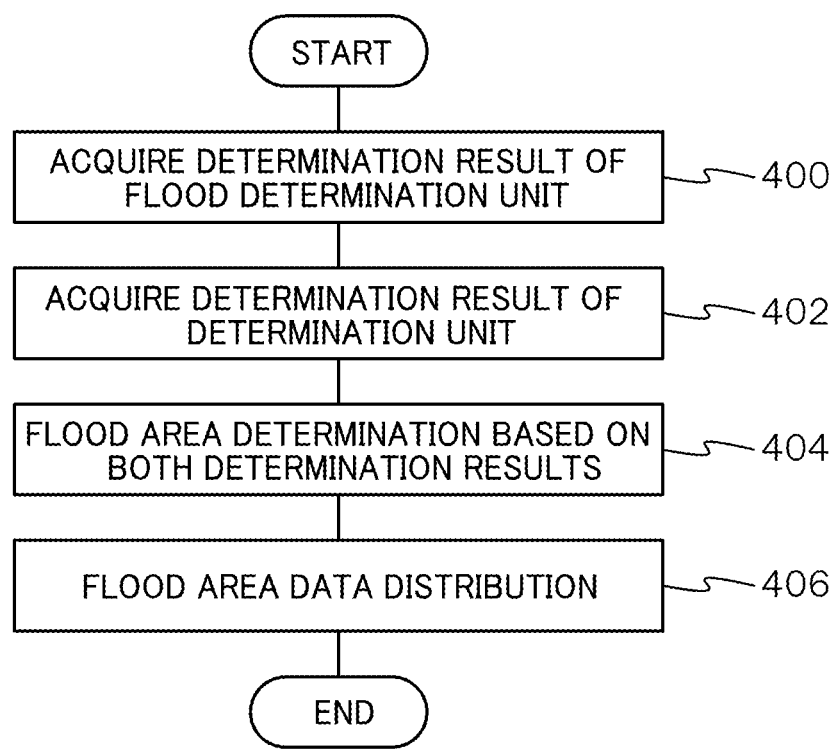
FIG. 11 is a flowchart showing an example of a flow of processing in which a central processing unit estimates a flood area in a flood determination center in the flood detection system according to the second embodiment.

Next, in the flood detection system 11 according to the present embodiment, a process in which the central processing unit 38 comprehensively determines the flooding of a road in the flood determination center 36 will be described. FIG. 11 is a flowchart showing an example of the flow of a process in which the central processing unit 38 comprehensively determines the flood of the road in the flood determination center 36 in the flood detection system 11 according to the present embodiment.

In step 400, the flood area determination unit 44 acquires the determination result of the flood determination unit 43 and shifts to step 402. That is, the determination result of the flooding determined by using the meteorological data and the traffic volume calculated based on the position data of the vehicle 12 is acquired.

In step 402, the flood area determination unit 44 acquires the determination result of the determination unit 42 and moves to step 404. That is, the determination result of the flood determined by using the traveling state data collected from the vehicle 12 is acquired.

In step 404, the flood area determination unit 44 determines the flood area based on the determination results of both, and proceeds to step 406. Here, a specific example of the method of determining the flood area based on the determination results of both will be described.

First, as the first determination method, it is premised that position data and CAN data are collected for each vehicle type and are made into a database and analyzed. Then, for each vehicle type, vehicle size, etc., the determination by the flood determination unit 43 and the determination by the determination unit 42 are performed separately, and the results of both are combined to determine the flood area. Specifically, in the traffic volume determination by the flood determination unit 43, the determination is limited to large vehicles. For example, it is determined that there is a possibility of flooding because there are many large vehicles such as trucks in this grid at a normal time but there are no large vehicles at this time. On the other hand, in the flood determination using the CAN data by the determination unit 42, the determination is limited to the small vehicles that are easily affected by the flood. For example, in grid i, it is determined that there is a high possibility of flooding at the current time. Then, the flood area is determined by combining both determination results and extracting the grid of the flood area.

As a second determination method, in the traffic volume determination by the flood determination unit 43, it is determined that the number of vehicles is less than or equal to the threshold. For example, this grid should have a high traffic volume at a normal time, but at the present time it is quite small, so it is determined that there is a possibility of flooding. Further, the flood determination using the CAN data is performed by the determination unit 42 with the small number of vehicles. For example, in grid i, it is determined that there is a high possibility of flooding at the current time. Thus, the flood area is determined by combining the determination results of both.

As a third determination method, the flood determination is performed by the flood determination unit 43. For example, grid i determines that there is a possibility of flooding. On the other hand, when the flood determination using the CAN data by the determination unit 42 obtains the flood determination results of the grids around the grid i, for example, if it is determined that there is a high possibility of flooding at the current time in the grids a to h surrounding the grid i, the grid i is also determined to be flooded, and the determination results of both are combined to determine the flood area.

In step 406, the flood area determination unit 44 delivers the flood area data indicating the determined flood area and ends the series of processes. For example, the flood area data is distributed to the data providing device 14 connected to the communication network 34 via the central communications unit 48. As a result, the flood area can be identified in the vehicle 12 equipped with each data providing device 14. Therefore, it is possible to select a route that does not pass through the flood area. For example, when the navigation device provides route guidance through the flood area, it is possible to reroute a route that avoids the flood area. Alternatively, the flood area data may be distributed to a weather forecasting company or the like that requires the flood area data to obtain a consideration.

In the second embodiment, the example in which the vehicle behavior model is used for each vehicle type has been described. However, it is not limited to this. For example, in an area where the traffic volume is low compared to a normal time, the vehicle behavior model may be derived using CAN data collected from all vehicle types instead of each vehicle type, from which the flood determination may be performed.

Figure 12:
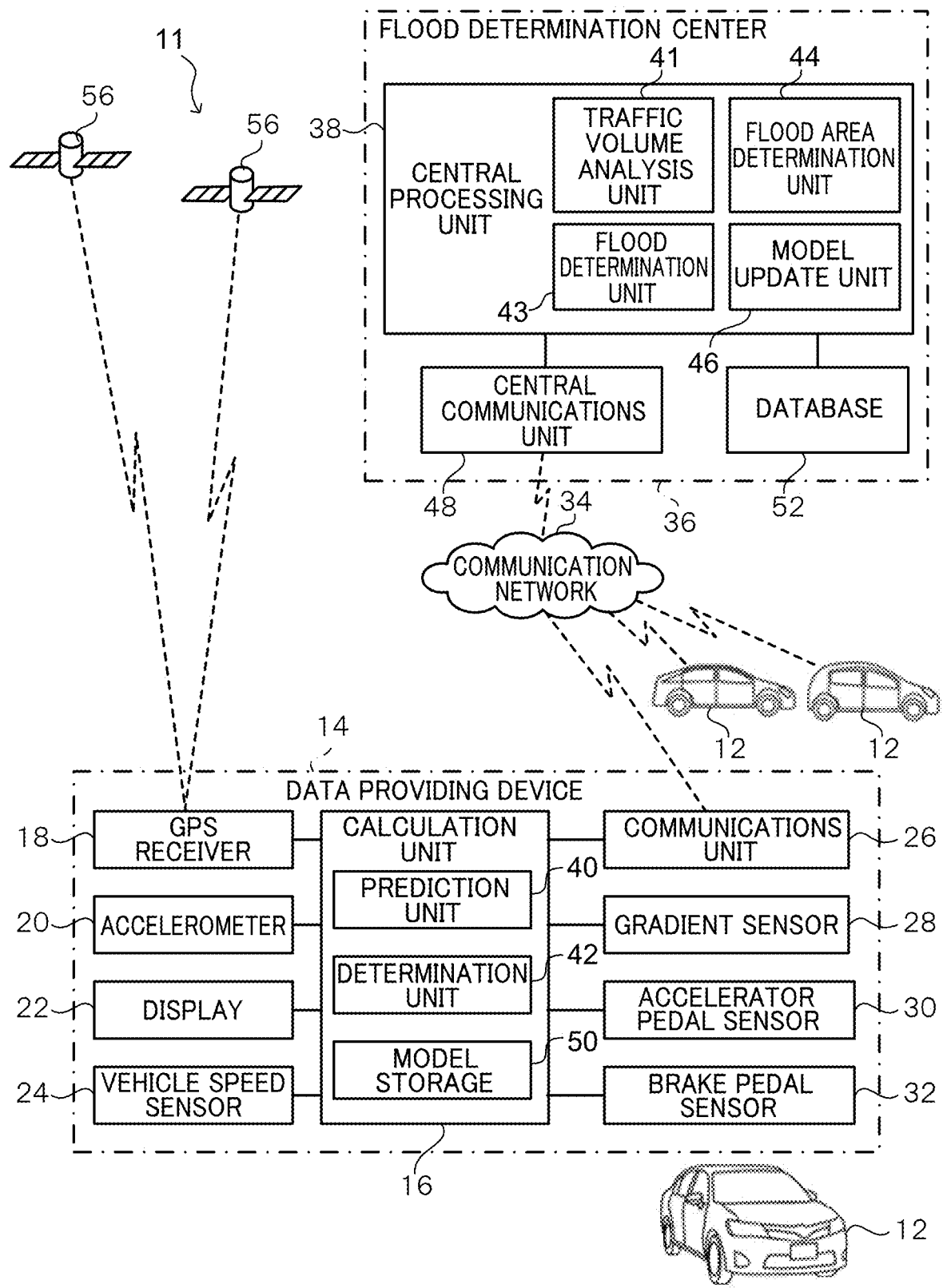
FIG. 12 is a block diagram showing a configuration example of a flood detection system when the flood determination is performed on the data providing device mounted on each vehicle.

Further, in the second embodiment, an example has been described in which the flood determination center 36 side performs the flood determination. However, it is not limited to this. For example, the flood determination may be performed on the data providing device 14 mounted on each vehicle 12. FIG. 12 is a block diagram showing a configuration example of the flood detection system 11 when the flood determination is performed on the side of the data providing device 14 mounted on each vehicle 12. In this case, as shown in FIG. 12, the data providing device 14 is provided with the functions of the prediction unit 40, the determination unit 42, and the model storage unit 50. That is, the model storage unit 50 derives and stores in advance a vehicle behavior model corresponding to the vehicle type of the vehicle 12 equipped with the data providing device 14. Alternatively, plural vehicle behavior models for each vehicle type are derived and stored in advance, and the vehicle behavior model corresponding to the host vehicle 12 is selected when used. Then, the processing unit 16 of the data providing device 14 executes the processing of FIG. 10. As a result, the prediction unit 40 can calculate the predicted value and the determination unit 42 can perform the flood determination as in the above embodiment. When comprehensively determining the flooding of the road, the central processing unit 38 of the flood determination center 36 collects the determination result of the flood by the determination unit 42 from each vehicle 12 and performs the process of FIG. 11. As a result, the flood determination center 36 can comprehensively determine the flood of the road using the two determination results. When the flood determination is performed on the data providing device 14 mounted on each vehicle 12, the process of FIG. 10 is appropriately converted to the process performed by the calculation unit 16. Further, in this case, the process of step 300 executed by the calculation unit 16 corresponds to the acquisition unit, and the processes of steps 302 to 310 correspond to the detection unit.

Figure 13:
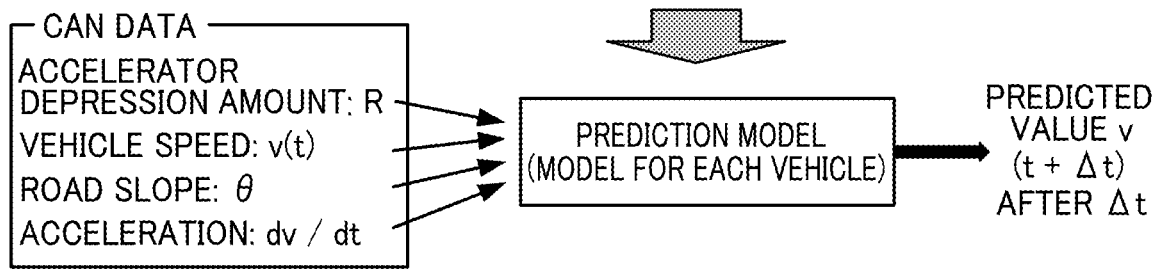
FIG. 13 is a diagram for explaining another example of the vehicle behavior model.

Further, in the above embodiment, an example in which the multiple regression equation is used as the vehicle behavior model has been described. However, the vehicle behavior model is not limited to machine learning by multiple regression. For example, as shown in FIG. 13, the vehicle behavior model uses CAN data (accelerator depression amount R, vehicle speed $v(t)$, road slope $\theta$, acceleration $dv/dt$, etc.) for each term of the explanatory variables of the prediction formula. In this way, various prediction models for obtaining the prediction value $v(t+\Delta t)$ after $\Delta t$ seconds can be applied. As an example of a prediction model other than the multiple regression analysis, various machine learning models such as a neural network and Support Vector Regression (SVR) may be applied.

In addition, in the second embodiment, a vehicle behavior model that determines the vehicle speed as a physical quantity is used. However, the physical quantity is not limited to this. For example, a vehicle behavior model for obtaining other physical quantities such as acceleration and the rate of change of acceleration may be used.

Further, in the second embodiment, the vehicle behavior model is derived with the resistance F2 that the vehicle 12 receives being the air resistance, the gradient resistance, the rolling resistance, and the acceleration resistance. However, the resistance F2 that the vehicle 12 receives is not limited to this. For example, since the acceleration resistance is smaller than the other resistances, the acceleration resistance may be omitted.

Further, in each of the above-described embodiments, the rainfall data is acquired from the meteorological data center 60 and detected during or after the rainfall. However, it is not limited to this. For example, in the case where each vehicle 12 is equipped with a raindrop sensor, data regarding the presence/absence of rainfall detected by the raindrop sensor is acquired from each vehicle 12 as meteorological data to detect the time of rain or after rain.

Further, the processing performed by each part of the flood detection system 10 in each of the above-described embodiments has been described as the software processing performed by executing the program. However, it is not limited to this. For example, the processing may be performed by hardware. Alternatively, the processing may be a combination of both software and hardware. In the case of software processing, the program may be stored in various storage media and distributed.

Furthermore, it is needless to say that the present disclosure is not limited to the above, and can be variously modified and implemented in a range other than the above without departing from the gist thereof.

What is claimed is:

1. A flood detection device comprising:
   at least one processor that is configured to:
   acquire meteorological data;
   acquire traffic volume data representing vehicle traffic volume;
   determine that an area, in which a vehicle traffic volume during or after rain is less than or equal to a predetermined number of vehicles, is flooded based on the meteorological data and the traffic volume data, when a probability, that the vehicle traffic volume in a normal time is less than or equal to the predetermined number of vehicles, is less than a predetermined value, the normal time being a state in which a rainfall amount is less than a predetermined value; and
   distribute flood area data indicating the area determined to be flooded.

2. The flood detection device according to claim 1, wherein the at least one processor is further configured to acquire position data and date/time data from vehicles as the traffic volume data.

3. The flood detection device according to claim 1, wherein the at least one processor is further configured to acquire the traffic volume data from a roadside detection device.

4. The flood detection device according to claim 1, wherein the at least one processor is further configured to:
   acquire a plurality of types of traveling state data relating to vehicle traveling and acquire vehicle type data, from a vehicle;
   detect flooding of the road on which the vehicle travels using a physical quantity predicted based on the plurality of types of traveling state data currently acquired and a vehicle behavior model that calculates a physical quantity that changes as the vehicle travels, and a physical quantity obtained from the current traveling state data; and
   determine a flood area using a determination result that the area is flooded and the detection result.

5. The flood detection device according to claim 2, wherein the at least one processor is further configured to:
   acquire a plurality of types of traveling state data relating to vehicle traveling and acquire vehicle type data, from a vehicle;
   detect flooding of the road on which the vehicle travels using a physical quantity predicted based on the plurality of types of traveling state data currently acquired and a vehicle behavior model that calculates a physical quantity that changes as the vehicle travels, and a physical quantity obtained from the current traveling state data; and
   determine a flood area using a determination result that the area is flooded and the detection result.

6. The flood detection device according to claim 3, wherein the at least one processor is further configured to:
   acquire a plurality of types of traveling state data relating to vehicle traveling and acquire vehicle type data, from a vehicle;
   detect flooding of the road on which the vehicle travels using a physical quantity predicted based on the plurality of types of traveling state data currently acquired and a vehicle behavior model that calculates a physical quantity that changes as the vehicle travels, and a physical quantity obtained from the current traveling state data; and
   determine a flood area using a determination result that the area is flooded and the detection result.

7. The flood detection device according to claim 1, wherein the at least one processor is further configured to:
   acquire a plurality of types of traveling state data regarding traveling and acquire vehicle type data, from a plurality of vehicles;
   using the plurality of types of traveling state data acquired in advance from the plurality of vehicles and a predetermined learning model, derive a vehicle behavior model that calculates a physical quantity that changes as the vehicles travel;
   detect flooding of the road on which a predetermined target vehicle travels using a physical quantity predicted using the derived vehicle behavior model, the plurality of types of traveling state data currently acquired from the target vehicle, and a physical quantity obtained from the traveling state data acquired from the target vehicle; and
   determine a flood area using a determination result that the area is flooded and the detection result.

8. The flood detection device according to claim 2, wherein the at least one processor is further configured to:
   acquire a plurality of types of traveling state data regarding traveling and acquire vehicle type data, from a plurality of vehicles;
   using the plurality of types of traveling state data acquired in advance from the plurality of vehicles and a predetermined learning model, derive a vehicle behavior model that calculates a physical quantity that changes as the vehicles travel;
   detect flooding of the road on which a predetermined target vehicle travels using a physical quantity predicted using the derived vehicle behavior model, the plurality of types of traveling state data currently acquired from the target vehicle, and a physical quantity obtained from the traveling state data acquired from the target vehicle; and determine a flood area using a determination result that the area is flooded and the detection result.

9. The flood detection device according to claim 3, wherein the at least one processor is further configured to:

acquire a plurality of types of traveling state data regarding traveling and acquire vehicle type data, from a plurality of vehicles;

using the plurality of types of traveling state data acquired in advance from the plurality of vehicles and a predetermined learning model, derive a vehicle behavior model that calculates a physical quantity that changes as the vehicles travel;

detect flooding of the road on which a predetermined target vehicle travels using a physical quantity predicted using the derived vehicle behavior model, the plurality of types of traveling state data currently acquired from the target vehicle, and a physical quantity obtained from the traveling state data acquired from the target vehicle; and determine a flood area using a determination result that the area is flooded and the detection result.

10. A flood detection system comprising:
at least one processor that is configured to:
detect vehicle traffic volume;
acquire traffic volume data representing the detected traffic volume;
acquire meteorological data;
determine that an area, in which the vehicle traffic volume during or after rain is less than or equal to a predetermined number of vehicles, is flooded based on the meteorological data and the traffic volume data, when a probability, that the vehicle traffic volume in a normal time is less than or equal to the predetermined number of vehicles, is less than a predetermined threshold, the normal time being a state in which a rainfall amount is less than a predetermined value; and
distribute flood area data indicating the area determined to be flooded.

11. A flood detection system comprising:
at least one processor that is configured to:
detect vehicle traffic volume;
acquire traffic volume data representing the detected traffic volume;
acquire meteorological data;
determine that an area, in which the vehicle traffic volume during or after rain is less than or equal to a predetermined number of vehicles, is flooded based on the meteorological data and the traffic volume data, when a probability, that the vehicle traffic volume in a normal time is less than or equal to the predetermined number of vehicles, is less than a predetermined threshold, the normal time being a state in which a rainfall amount is less than a predetermined value;

detect a plurality of types of traveling state data regarding vehicle traveling;

acquire the plurality of types of traveling state data and acquire vehicle type data, from a plurality of vehicles;

using the plurality of types of traveling state data acquired in advance from the plurality of vehicles and a predetermined learning model, derive a vehicle behavior model that calculates a physical quantity that changes as the vehicles travel;

detect flooding of the road on which a predetermined target vehicle travels using a physical quantity predicted using the derived vehicle behavior model, the plurality of types of current traveling state data acquired from the target vehicle, and a physical quantity obtained from the traveling state data acquired from the target vehicle; and determine a flood area using the determination result that the area is flooded and the detection result.

12. A non-transitory computer readable-storage medium storing a flood detection program executable to cause a computer to:

acquire meteorological data;

acquire traffic volume data representing vehicle traffic volume;

determine that an area, in which a vehicle traffic volume during or after rain is less than or equal to a predetermined number of vehicles, is flooded based on the meteorological data and the traffic volume data, when a probability, that the vehicle traffic volume in a normal time is less than or equal to the predetermined number of vehicles, is less than a predetermined value, the normal time being a state in which a rainfall amount is less than a predetermined value; and distribute flood area data indicating the area determined to be flooded.

13. The flood detection device according to claim 1, wherein the at least one processor is further configured to distribute the flood area data to a navigation device of a vehicle.

14. The flood detection device according to claim 1, wherein the at least one processor is further configured to distribute the flood area data to a navigation device of a vehicle such that the navigation device is able to reroute the vehicle to avoid the area determined to be flooded.

* * * * *